(12) United States Patent
Ferreyra

(10) Patent No.: US 9,141,721 B2
(45) Date of Patent: Sep. 22, 2015

(54) USER SPECIFIC DESKTOP HYPERLINKS TO RELEVANT DOCUMENTS

(75) Inventor: Joseph A. Ferreyra, Roeland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1149 days.

(21) Appl. No.: 12/234,270

(22) Filed: Sep. 19, 2008

(65) Prior Publication Data

US 2010/0077287 A1 Mar. 25, 2010

(51) Int. Cl.
*G06F 17/30* (2006.01)

(52) U.S. Cl.
CPC ............... *G06F 17/30899* (2013.01)

(58) Field of Classification Search
USPC .................. 715/205–207, 234, 273
See application file for complete search history.

(56) References Cited

U.S. PATENT DOCUMENTS

| | | | | |
|---|---|---|---|---|
| 5,995,951 | A * | 11/1999 | Ferguson | 706/10 |
| 6,061,695 | A * | 5/2000 | Slivka et al. | 715/203 |
| 6,067,548 | A * | 5/2000 | Cheng | 1/1 |
| 6,278,448 | B1 * | 8/2001 | Brown et al. | 715/866 |
| 6,768,988 | B2 * | 7/2004 | Boreham et al. | 707/770 |
| 6,807,666 | B1 * | 10/2004 | Evans et al. | 718/108 |
| 7,127,719 | B2 * | 10/2006 | Evans et al. | 718/108 |
| 7,752,553 | B2 * | 7/2010 | Pennington et al. | 715/751 |
| 2002/0138758 | A1 * | 9/2002 | Cason et al. | 713/201 |
| 2003/0009521 | A1 * | 1/2003 | Cragun | 709/205 |
| 2004/0104929 | A1 * | 6/2004 | Chen et al. | 345/738 |
| 2004/0205219 | A1 * | 10/2004 | Li et al. | 709/231 |
| 2007/0094390 | A1 * | 4/2007 | Nussey | 709/225 |
| 2007/0150444 | A1 * | 6/2007 | Chesnais et al. | 707/3 |
| 2008/0082628 | A1 * | 4/2008 | Rowstron et al. | 709/217 |
| 2008/0147640 | A1 * | 6/2008 | Schachter | 707/5 |

OTHER PUBLICATIONS

Microsoft Computer Dictionary; May 1, 2002; Microsoft Press; Fifth Edition; p. 83.*
"Collaborate;" Webster's Ninth New Collegiate Dictionary; 1991; Merriam-Webster Inc.; Ninth Edition; p. 259.*

* cited by examiner

*Primary Examiner* — Andrew Dyer
(74) *Attorney, Agent, or Firm* — Swanson & Bratschun, L.L.C.

(57) ABSTRACT

A method and system for displaying a list of documents on a desktop background on a computing device including assigning each user from a group of users to a group membership being selected from among a plurality of group memberships. An electronic file may be determined for users assigned to the selected group membership. The electronic file may be assigned as a desktop background on a computing device of each user assigned to the group membership, the assignment of the electronic file operable to cause the electronic file to be displayed as the desktop background, the electronic file including a predetermined listing of links of documents associated with the group membership.

14 Claims, 4 Drawing Sheets

US 9,141,721 B2

USER SPECIFIC DESKTOP HYPERLINKS TO RELEVANT DOCUMENTS

BACKGROUND OF THE INVENTION

Today, documents outlining "best practices" and other documents referred to as "white papers" may be found on seemingly every topic from software development to corporate governance. Procedure documents and other standards documents have been created to ensure that the best practices are able to be followed. Even routine tasks that a person performs daily on their job may have an associated procedure that lists the steps needed to be taken in order to perform the tasks. In some industries, such as telecommunications, technicians may be responsible for maintaining a product or device, and may use the procedure documents as a checklist while performing the task. Use of these procedure documents may be required by various industries in order to maintain important certifications or to be in compliance with codes or laws.

There are various standards organizations such as the International Organization for Standardization (ISO) that consist of committees and subcommittees that are responsible for developing standards in many different fields. In order to be certified as compliant with a particular standard, often it is necessary to prove, during an audit or otherwise, that all of an organization's members are using procedure documents, as required. Another common requirement may be that the latest version of a procedure document must always be used. To ensure that any changes to the procedure are available to all technicians or associates, the organization may implement a document control system to be accessed each time a procedure is to be used. Document control systems are commonly known in the art and provide version control and other benefits to documents of all types. Each time the technician or associate would like to access the document, the document control system must be accessed and the correct document located by a search or a similar method.

Various operating systems are commonly used today, with operating systems (OS) from MICROSOFT™, such as the WINDOWS XP™ operating system, being one of the most prevalent. A user of the WINDOWS™ OS is able to select a background for the desktop environment, commonly referred to as wallpaper. Generally, an image file with a JPG, GIF, or BMP file type is selected, but several other file types may also be selected, such as HTML. When the desktop is displayed, the selected background image file is presented along with icons for opening documents or applications and other items typically found on the desktop.

Currently, in order to locate a procedure document within some document management systems, a web browser or other application related to the document management system may be launched for the procedure document to be located. A search for the procedure document may also be necessary once the document management system is opened to locate the procedure document, as well. Not having the correct procedure document or the knowledge of which procedure documents are necessary can be inefficient and cause errors, mimizing the effectiveness of the best practices as embodied in the procedure document.

BRIEF SUMMARY OF THE INVENTION

In one embodiment of the present invention, in order to provide each user with a listing of their relevant procedure documents, as well as easy access to the latest version of the procedure documents, an HTML file may be generated for each user, or for each group in which a user may belong. Within the HTML file may be hyperlinks pointing to the relevant documents. The HTML file may be assigned as the desktop background on each user's machine, causing the desktop background to display the listing of the relevant documents.

In one embodiment of the present invention, a method for displaying a list of documents on a desktop background on a computing device includes assigning each user from a group of users to a group membership being selected from among a plurality of group memberships. An electronic file may be determined for users assigned to the selected group membership. The electronic file may be assigned as a desktop background on a computing device of each user assigned to the group membership, the assignment of the electronic file operable to cause the electronic file to be displayed as the desktop background, the electronic file including a predetermined listing of links of documents associated with the group membership.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1A:
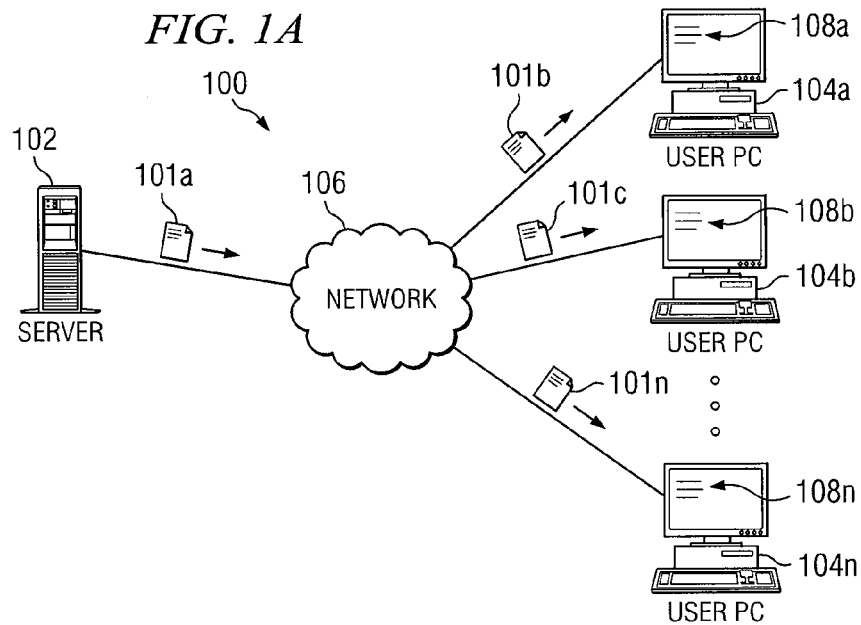
FIG. 1A is one embodiment of an environment for communicating an electronic file containing a list of relevant documents to network users.

FIG. 1A is one embodiment of an environment 100 for communicating an electronic file containing a list of relevant documents to network users. In one embodiment, a server 102 may communicate electronic files 101a-101n (collectively 101) to remote users 104a-104n (collectively 104) via a network 106. The server 102 may be a stand alone computing device connected to the network 106 or may be one of multiple computing devices connected to the network 106. Software modules (not shown) may be executed by the server 102 for generating the electronic file 101 for display by the remote users 104.

In one embodiment, the electronic file 101 may be an HTML file that is generated containing predetermined or selectable hyperlinks to one or more documents that are relevant to a particular user or a group related to a user. In addition to HTML, the file type of electronic file 101 may be a PDF, XLS, or any other type of file that computing device located at the remote user 104 is configured to display and the electronic file may include any suitable link. The linked documents may be located anywhere in the network. In one embodiment, the documents are located within a document control system, such as the DOCSOPEN™, or DOC-SHARE™ document control systems, or any other document control system commonly known in the art. In addition, the generated electronic file 101 may also be located within a similar document control system, or otherwise accessed from the network. An example of a document commonly found in a document control system includes controlled process documents. Controlled process documents may be documents outlining a process for performing an activity. Often controlled processes are highly regulated and compliance with the process document is required for certifications or to maintain a license.

Remote users 104 may be located anywhere in communication with the network 106. Each remote user 104 may have an associated profile (not shown) with various attributes stored for the user or group in which the user is a member (the latter being referred to herein as a "membership group"). The attributes may be used for generating the electronic file 101 to be sent to the remote user 104. Some example attributes may include a job category (e.g., associate, technician), seniority (e.g., management, partner), position, and assigned tasks. Any other number of identifiable attributes may also be used to generate electronic file 101, whether associated with the particular user or not. For example, on a particular day of the week or some other period of time, a different electronic file 101 may be generated, even for the same user, based on non-user specific attributes. For example, if every Wednesday a backup is created of a device hard drive, the procedure documents to be executed that day may additionally include the proper procedure for the backup. A mote detailed description for generating the electronic file 101 is described below in FIG. 5.

The network 106 may be the Internet, a LAN, WAN, wired Ethernet, wireless, or any other type of network configured to communicate an electronic file 101 between a server 102 and remote users 104 and commands or other input from remote users 104 to the server 102.

The electronic file 101 may be assigned as a desktop background 108a-108n (collectively 108) on the computing device of a remote user 104. Each remote user 104, or group in which the remote user 104 is a member, may have a unique electronic file 101. Desktop backgrounds 108, which are sometimes referred to as wallpaper, are widely known in the art. In the past, pictures or other "decorative" images have been used for desktop backgrounds 108. The electronic file 101 communicated from the server 102, may be assigned as the desktop background 108 on a computing device of the remote user 104. In one embodiment, the desktop background 108 is derived from an electronic file 101 of file type HTML and may contain one or more links to relevant documents located within a document control system. A more detailed description of generating the electronic file 101 will be described below in FIG. 5.

Figure 1B:
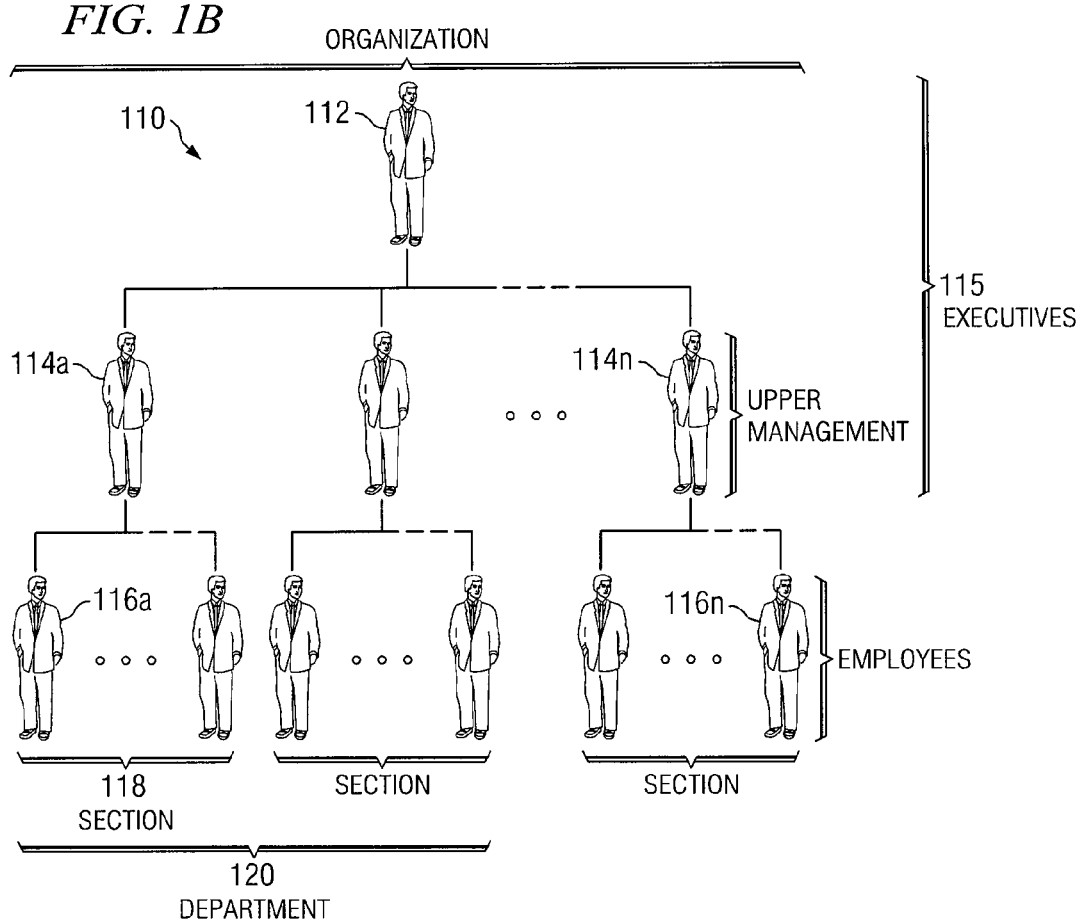
FIG. 1B is one embodiment of a organization chart depicting group membership, according to principles of the present invention.

FIG. 1B is one embodiment of an organization chart 110 depicting a group membership hierarchy, as may be used for selecting relevant documents, according to principles of the present invention. An organization head 112, such as a CEO or president, may be grouped together with upper management 114a-114n (collectively 114) in a group defined as executives 115. Others within the organization, outside of the executives 115, may be referred to simply as employees 116a-116n (collectively 116).

The divisions described thus far are based on horizontal groupings, however, group memberships may also be derived vertically. Horizontal group membership is defined as membership across peer groups, on the same level, in an organization. For example, multiple sections may make up a department. The horizontal group membership may include the multiple sections. Vertical group membership is defined as membership grouped from top to bottom or bottom to top. For example, a person who is a supervisor of a department may also be a member of the department. Sections 118 may exist with members being derived from employees 116, upper management 114, and executives 115. Several sections 118 may also exist within a department 120. All of the various group membership possibilities, as well as individuals within the organization chart 112, may have an associated unique electronic file 101. Upon the determination that the remote user 104 is within a particular group, the electronic file 101 that is most relevant for the remote user 104 may be provided. For remote users 104 falling within multiple group memberships, links to relevant documents contained within multiple electronic files 101 file may be combined into a single electronic file 101 for the remote user 104. The merger of relevant documents from the multiple electronic files 101 associated with the remote user 104 may provide the most relevant documents possible.

Figure 2:
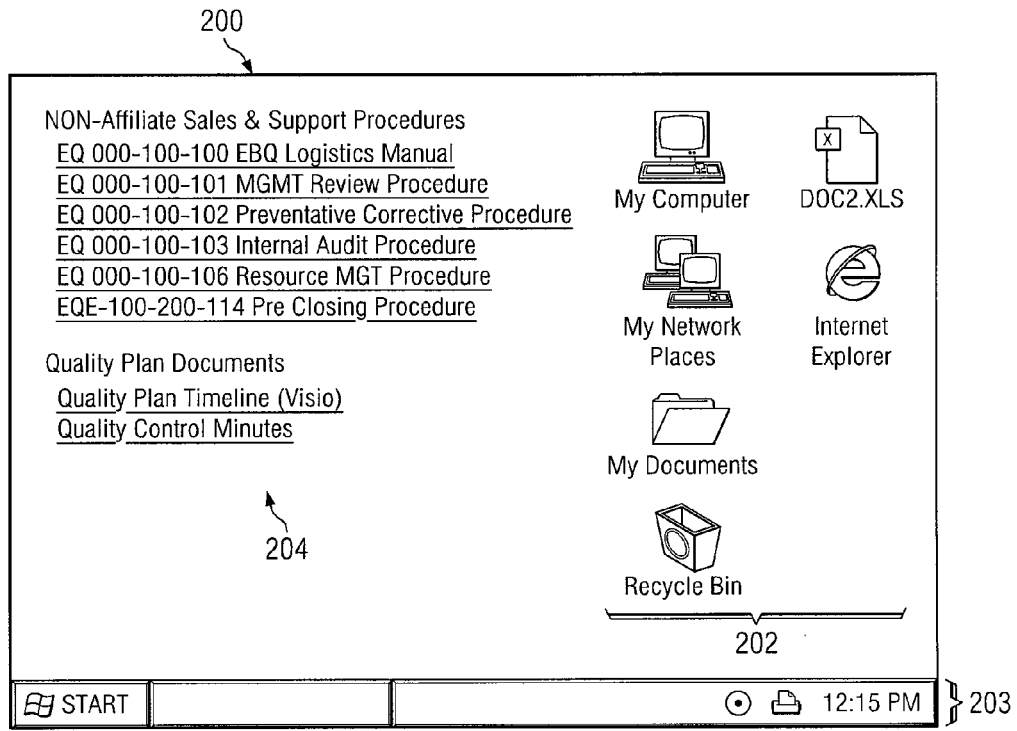
FIG. 2 is an illustration of one embodiment of a screen shot depicting principles of one embodiment of the present invention, including selectable links to documents, such as Hyper Text Markup Language hyperlinks.

FIG. 2 is an illustration of one embodiment of screen shot 200 depicting principles of the present invention, including selectable links to documents, such as Hyper Text Markup Language (HTML) hyperlinks. The screen shot 200 depicts traditional items located on a desktop, such as icons 202 and a taskbar 203, but the desktop also depicts selectable links 204 as previously described. The selectable links 204 may be generated by an HTML file which is assigned as the desktop background. Rather than having to manually open a browser window and initiate a search in a document control system to locate relevant files, having the selectable links 204 appear as the desktop background may allow for immediate access to the most recent version of a document within a document management system, yielding greater efficiencies.

The selectable links 204 may reference documents located both within and outside of a document control system. By selecting a link displayed on the desktop background, if a document control system needs to be accessed, it can be accessed without any other action by a user. In addition, only the selectable links pertaining to documents relevant to a particular user may be displayed on the desktop background. This may help to reduce the amount of time it takes to locate the documents, reduce clutter by not displaying unnecessary documents, and always pull the latest version of the relevant documents.

Figure 3:
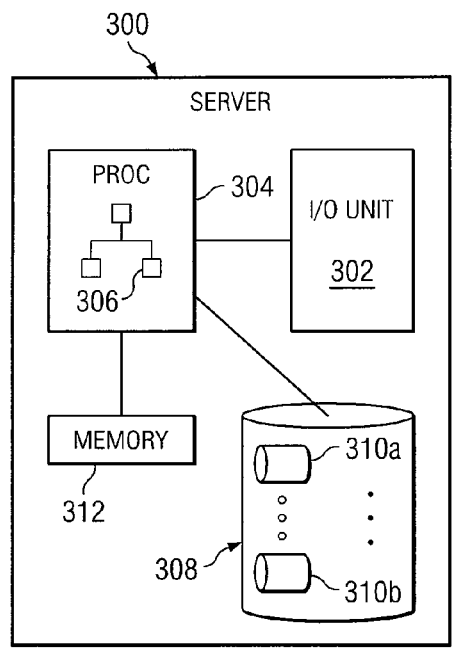
FIG. 3 is a block diagram of one embodiment of components of a server configured to facilitate generating and communicating a file containing a list of relevant documents.

FIG. 3 is a block diagram of one embodiment of components of a server 300 configured to facilitate generating and communicating an electronic file containing a list of relevant documents. The server 300 may include an input/output (I/O) unit 302 for receiving data and communicating electronic files, such as an HTML file containing links to relevant documents. The I/O unit 302 may additionally include a modem or other network connector (not shown) for connecting to end users as described above. The server 300 may also include a processor 304 for processing the storing, generation, and communication of the electronic file, and the generation of the document selection screen, among other functions. The processor 304 may execute software 306 capable of performing the functionality of the present invention.

Memory 312 may also be located within the server 300 for storing data being processed by the processor 304. A data repository 308 may also be included in or may be in communication with the server 300. The data repository 308 may be a hard drive or any other type of volatile or non-volatile memory capable of storing electronic files and other necessary data. Within the data repository 308 may be one or more data repositories 310a-310n, such as a database or multiple databases, capable of storing and organizing user and group profiles as well as the electronic files. In one embodiment, rather than including the data repository 308, the server 300 may use a memory 312 that is large enough to store necessary data.

Figure 4:
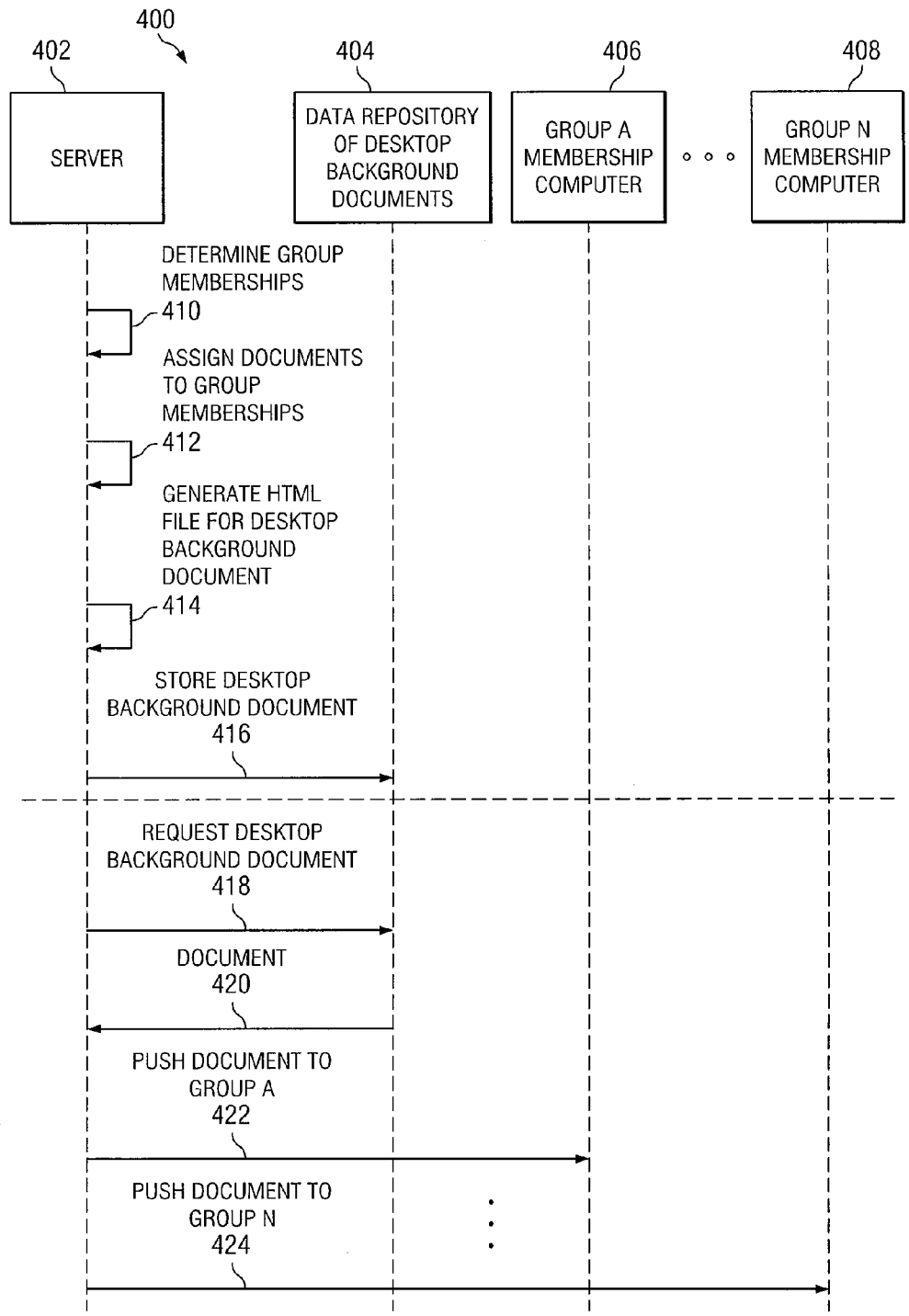
FIG. 4 is a timing diagram depicting one embodiment of data exchange between various components according to principles of the present invention.

FIG. 4 is a timing diagram 400 depicting one embodiment of data exchange between various components according to principles of the present invention. The components described in this embodiment include a server 402, a data repository 404 of desktop background documents, a computer with a user belonging to group A membership 406, and a computer belonging to group N membership 408. This embodiment is described from the perspective of a user belonging to a particular group with a relevant desktop background being intended for all users in the particular group. It is to be understood that desktop background files may also be generated for specific users, regardless of group membership, as well. Also, the server 402 may be anywhere in a network, with the server being in communication with an end user. Similarly, the data repository 404 may be located anywhere in communication with the server 402 and an end user.

At step 410, group memberships may be determined for each end user using the server 402. A profile may exist for each user with various groups being associated with each user or profiles for groups may be defined with various users being associated with the groups. Any other combination for associating users with relevant documents may also be used.

Figure 5:
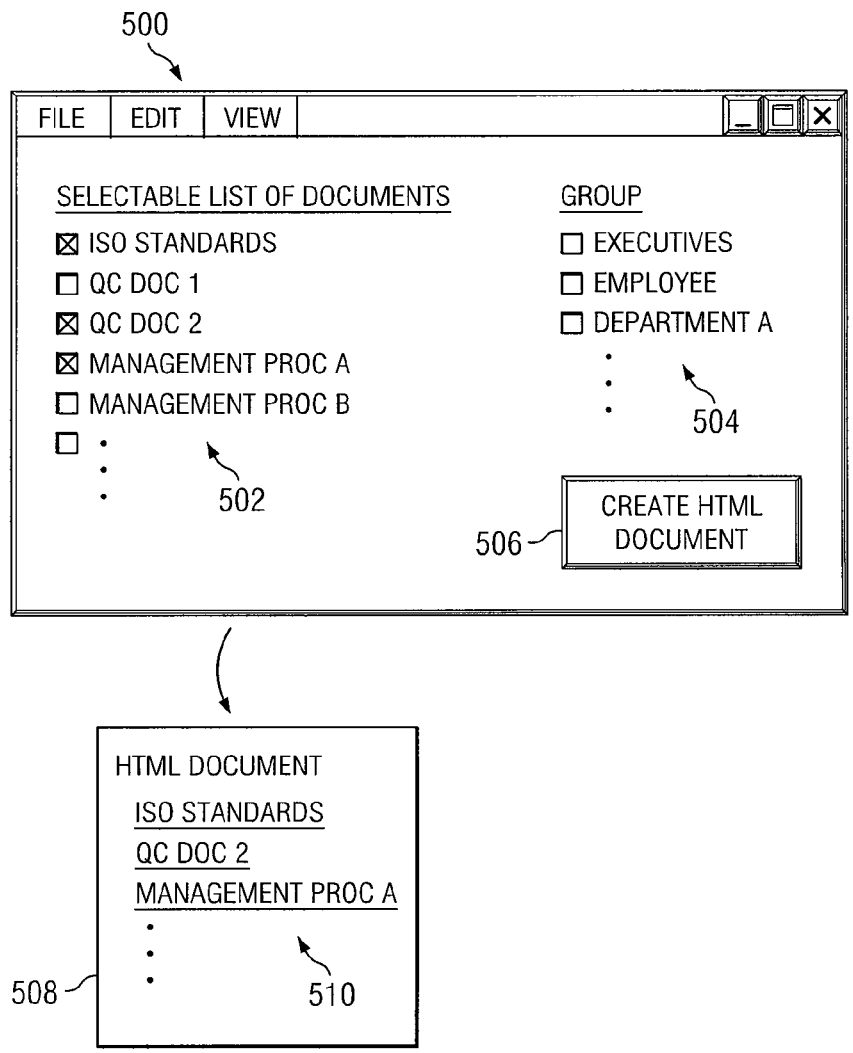
FIG. 5 is an illustration of a screen shot depicting one embodiment of a document generator for selecting relevant documents as well as a sample html page that has been generated, according to principles of the present invention.

In step 412, documents that are relevant to members of particular groups may be assigned. There may be a listing of documents displayed, and for each group, the documents that are determined to be relevant to members of a particular group are associated with the group. FIG. 5 describes assigning documents to group memberships in greater detail. Using the assignment information from step 412, an HTML document, for use as a desktop background containing links to the group membership assigned documents, may be generated in step 414. In an alternative embodiment, if the documents are assigned to an individual end user, the HTML file for use as a desktop background may be generated for the particular user. In step 416, the desktop background document is stored in the data repository 404.

At various times, the desktop background document may be sent to members of the various groups. In step 418, a request may be sent from the server 402 to the data repository 404 for a desktop background document. In step 420, the requested desktop background document may be returned to the server 402 from the data repository 404. In one embodiment, as members from various groups log in or request an updated file, the current desktop background document will need to be pushed to the computer. For example, if a user with membership in group A logs in, the desktop background document may be pushed to the user's computer in step 422. Similarly, when a member belonging to group N logs in, the desktop background document relevant to group N's members will be pushed, as depicted in step 424. Having the desktop background document pushed from the server 402 allows the latest version of the desktop background document to be received by the computer and allows for central management of the desktop background documents.

FIG. 5 is an illustration of a screen shot 500 depicting one embodiment of an HMTL document generator for selecting relevant documents as well as one embodiment of a sample html page 508 that has been generated. In this embodiment, an application may be presented to a user displaying a list of documents 502 that are accessible to the user. Selections may be made of the documents 502, as depicted by the boxes with the X marks. Along with the list of documents 502, there may be a listing of groups 504 in which the selected files should be associated. In addition to the groups, individual users (not shown) may also be selected in the event that individual users profiles are desired to be generated. When the appropriate selections are made, an indication for the HTML document to be created may be made by choosing the "Create HTML Document" selection button 506. An HTML document 508 may then be generated. A list 510 of selectable links is shown, with the selected documents from the listing of groups 504 being displayed.

Figure 6:
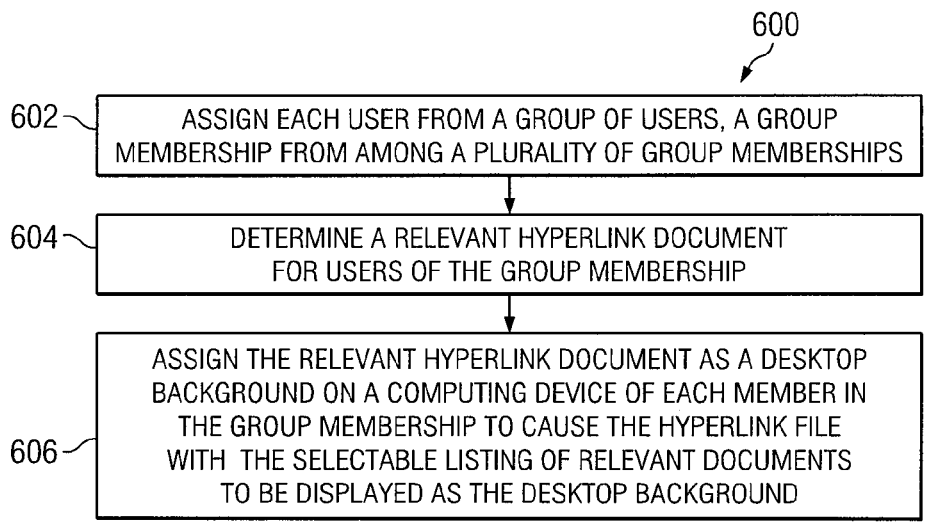
FIG. 6 is a flow chart of one embodiment of a process for generating and displaying a list of documents on a computing device in accordance with the principles of the present invention.

FIG. 6 is a flow chart 600 of one embodiment of a process for generating and displaying a list of documents on a computing device in accordance with the principles of the present invention. In step 602, each user from a group of users may be assigned a group membership from among a plurality of group memberships. A user may be any member of an organization, employee of a business, or a user of any network. Group memberships, as described previously in regard to FIG. 1B may involve any number of divisions, both horizontally and vertically. Given the nature of some group memberships overlapping, group memberships may include as few as a single user in order for the most relevant documents to be displayed for a particular user.

In step 604, a relevant hyperlink document may be determined for users of the group membership. As described in FIG. 5, documents pertaining to a particular group membership, such as executives, may be associated with the group membership. Links to the associated documents may be included in a hyperlink document that is generated for the group membership. After making the determination, the hyperlink document may be generated and stored for use by the group membership as they are needed.

In step 606, the relevant hyperlink document may be assigned as a desktop background on a computing device of each member in the group membership to cause the hyperlink file with the selectable listing of relevant documents to be displayed as the desktop background. The relevant hyperlink document may be assigned by each member manually selecting the determined relevant hyperlink document as the desktop background, by a network administrator, or other macro or script that runs as part of the login process. There may also be an automatic refresh of the assigned document in the event that changes to the relevant hyperlink document occurs. When the desktop background is displayed on the member's computing device, the hyperlink document may be shown, rather than a traditional wallpaper, allowing for direct access to the linked documents.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for displaying a list of documents on a desktop background on a computing device, said method comprising:

centrally assigning, without direct user input, a user from a group of users to a vertical group membership;

centrally assigning, without direct user input, the user to a horizontal group membership, the vertical and horizontal group memberships each being selected from among a plurality of group memberships;

determining an electronic file for users assigned to the selected vertical and horizontal group memberships;

determining, with a server computer, whether each user is a member of at least two groups with at least one electronic file associated with each group, wherein the at least two electronic files are combined into a single electronic file by the computing device;

assigning the electronic file as a desktop background on a computing device of each user assigned to the group membership, the assignment of the electronic file operable to cause the electronic file to be displayed as the desktop background, the electronic file including a predetermined listing of links of documents associated with the group membership; and determining, without direct user input, documents that are relevant for a particular user by determining controlled process documents related to a set of documents routinely used by the user.

2. The method according to claim 1, further comprising determining documents that are relevant for a particular user based on one or more group memberships of the particular user.

3. The method according to claim 1, wherein determining the electronic file for users assigned to the selected group membership includes determining an HTML file.

4. The method according to claim 1, further comprising pushing the determined electronic file from a server on a communications network to a user computer.

5. The method according to claim 4, further comprising automatically overwriting a local copy of the electronic file upon each login.

6. The method according to claim 1, further comprising opening a document located within a document control system by choosing one of the documents in the predetermined listing.

7. A system for generating and communicating a list of documents for display on a desktop background on a computing device, said system comprising:
    a processor; and
    a memory;
    wherein said processor is configured to:
    centrally assign, without direct user input, a user from a group of users to a vertical group membership;
    centrally assign, without direct user input, the user to a horizontal group membership, the vertical and horizontal group memberships each being selected from among a plurality of group memberships;
    determine an electronic file for users assigned to the selected vertical and horizontal group memberships;
    determining, with a server computer, whether each user is a member of at least two groups with at least one electronic file associated with each group, wherein the at least two electronic files are combined into a single electronic file by the processor;
    assign the electronic file as a desktop background on a computing device of each user assigned to the group membership, the assignment of the electronic file operable to cause the electronic file to be displayed as the desktop background, the electronic file including a predetermined listing of links of documents associated with the group membership; and
    determine, without direct user input, documents that are relevant for a particular user by determining controlled process documents related to a set of documents routinely used by the user.

8. The system according to claim 7, wherein the processor is further configured to determine documents that are relevant for a particular user based on one or more group memberships of the particular user.

9. The system according to claim 7, wherein the processor, in generating an electronic file, generates an HTML file.

10. The system according to claim 7, wherein the I/O unit is further configured to push the assigned electronic file from a server on a communications network to a user computer.

11. The system according to claim 10, wherein the I/O unit is further configured to automatically overwrite a local copy of the electronic file upon each login.

12. The system according to claim 7, wherein the processor is further configured to open a document located within a document control system by choosing one of the documents in the predetermined listing from the desktop background.

13. A method for displaying a list of documents on a desktop background on a computing device, said method comprising:
    centrally assigning, without direct user input, a user from a group of users to a vertical group membership;
    centrally assigning, without direct user input, the user to a horizontal group membership;
    generating an electronic file for the user based on the vertical group membership and the horizontal group membership of the user;
    determining, with a server computer, whether each user is a member of at least two groups with at least one electronic file associated with each group, wherein the at least two electronic files are combined into a single electronic file by the computing device;
    assigning the single electronic file as a desktop background on a computing device of the user, the assignment of the electronic file operable to cause the electronic file to be displayed as the desktop background, the electronic file including a predetermined listing of links of documents; and
    determining, without direct user input, documents that are relevant for a particular user based on at least one attribute associated with the user, wherein the at least one attribute includes a job category, a job position, or an assigned task.

14. The method according to claim 13, wherein generating the electronic file for users includes generating an HTML file.

* * * * *